(12) United States Patent
Chen et al.

(10) Patent No.: US 12,306,014 B2
(45) Date of Patent: May 20, 2025

(54) METHOD AND SYSTEM FOR QUANTIFYING MAP ERRORS

(71) Applicant: GM Global Technology Operations LLC, Detroit, MI (US)

(72) Inventors: Gui Chen, Sterling Heights, MI (US); Bo Yu, Troy, MI (US); Brent Navin Roger Bacchus, Sterling Heights, MI (US); Shu Chen, Rochester Hills, MI (US); Joon Hwang, Pflugerville, TX (US); Michael Alan Losh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 18/171,848

(22) Filed: Feb. 21, 2023

(65) Prior Publication Data

US 2024/0280376 A1  Aug. 22, 2024

(51) Int. Cl.
| | |
|---|---|
| *G01C 21/00* | (2006.01) |
| *G01C 21/32* | (2006.01) |
| *G06T 7/38* | (2017.01) |
| *G06T 17/00* | (2006.01) |
| *G06T 17/05* | (2011.01) |

(52) U.S. Cl.
CPC ......... *G01C 21/3881* (2020.08); *G01C 21/32* (2013.01); *G01C 21/3815* (2020.08); *G06T 7/38* (2017.01); *G06T 17/005* (2013.01); *G06T 17/05* (2013.01); *G06T 2207/10028* (2013.01)

(58) Field of Classification Search
CPC ............................ G01C 21/3881; G06T 7/38
See application file for complete search history.

(56) References Cited

U.S. PATENT DOCUMENTS

| | | | | |
|---|---|---|---|---|
| 2019/0301873 | A1* | 10/2019 | Prasser | G01C 21/3848 |
| 2019/0302801 | A1* | 10/2019 | Zlot | H04W 4/46 |
| 2020/0240794 | A1* | 7/2020 | Prasser | G05D 1/0212 |
| 2020/0393268 | A1* | 12/2020 | Schroeter | G01C 21/387 |
| 2020/0393567 | A1* | 12/2020 | Schroeter | G01S 19/01 |
| 2021/0140769 | A1* | 5/2021 | Langland | G01N 33/0075 |
| 2021/0213973 | A1* | 7/2021 | Carillo Peña | G06N 3/063 |
| 2021/0343142 | A1* | 11/2021 | Lewis | G01S 19/01 |
| 2022/0113159 | A1* | 4/2022 | Hou | G01C 21/3461 |

(Continued)

FOREIGN PATENT DOCUMENTS

DE  102021121834 A1  3/2022

*Primary Examiner* — Jess Whittington
(74) *Attorney, Agent, or Firm* — Vivacqua Crane, PLLC

(57) ABSTRACT

A method for quantifying map errors includes receiving first map data and second map data. The method includes receiving a road topographic map. The method further includes dividing the road into road segments. The method further includes creating a plurality of bounding boxes for each of the plurality of road segments. The method includes creating a first map tile and a second map tile by filtering out the bounding boxes. The method includes executing point cloud registration to align the plurality of first data points in the first map tile with the plurality of second data points in the second map tile to determine a plurality of absolute offsets between the plurality of first data points and the plurality of second data points. The method includes determining a relative map error between the first map and the second map based on the absolute offsets.

15 Claims, 5 Drawing Sheets

(56) References Cited

U.S. PATENT DOCUMENTS

2023/0125048 A1* 4/2023 Iguchi ................. G06T 9/40
  382/232
2023/0209099 A1* 6/2023 Hur ................. H04N 19/174
  375/240.12

* cited by examiner

METHOD AND SYSTEM FOR QUANTIFYING MAP ERRORS

The present disclosure relates to methods and system for quantifying map errors.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Currently, vehicles use maps for navigation. These maps may originate from one or more sources.

SUMMARY

The present disclosure describes methods for quantifying map errors. In an aspect of the present disclosure, the method includes receiving first map data and second map data, wherein the first map data includes a first map of a geographic location. The second map data includes a second map of the same geographic location. The first map is different from the second map. The first map data includes a plurality of first data points. The second map data includes a plurality of second data points. The method further includes receiving a road topographic map. The road topographic map illustrates a road. The method further includes dividing the road of the road topographic map into a plurality of road segments. Each of the plurality of road segments has the same road length. The method further includes creating a plurality of bounding boxes for each of the plurality of road segments. Each of the plurality of bounding boxes encloses one of the plurality of road segments. The method further includes creating a first map tile and a second map tile by filtering out map data within one of the plurality of bounding boxes. The first map tile is obtained from the first map data. The second map tile is obtained from the second map data. The method further includes executing point cloud registration to align the plurality of first data points in the first map tile with the plurality of second data points in the second map tile using rotation and translation transformations to determine a plurality of absolute offsets between the plurality of first data points and the plurality of second data points. The method further includes determining a relative map error between the first map and the second map based on the absolute offsets between the plurality of first data points and the plurality of second data points. The method described in this paragraph improves vehicle technology and navigation technology by using the first map, the second map, and the relative error between the first map and the second map.

In an aspect of the present disclosure, the relative map error is a function of a sum of the absolute offsets after point cloud registration between the plurality of first data points and the plurality of second data points.

In an aspect of the present disclosure, each of the plurality of road segments are represented by a plurality of road-segment points. Each of the plurality of bounding boxes includes a first linear boundary, a second linear boundary, a third linear boundary, and a fourth linear boundary. The plurality of road-segments points includes a first road-segment point and a second road-segment point. The first linear boundary intersects the first road-segment point. The second linear boundary intersects the second road-segment point. The first linear boundary is parallel to the second linear boundary. The third linear boundary is parallel to the fourth linear boundary. The distance from the third linear boundary to the first road-segment point along the first direction is equal to the distance from the second road-segment point to the fourth linear boundary along the first direction. The height of the bounding box extends from the third linear boundary to the fourth linear boundary. The distance from the second road-segment point to the fourth linear boundary along the first direction is half of the height of the first bounding box.

In an aspect of the present disclosure, the plurality of first data points collectively forms a first point cloud. The plurality of second data points collectively forms a second point cloud. The first point cloud is a reference point cloud. The second point cloud is a working point cloud. Executing the point cloud registration includes generating a group of random offsets to change the working point cloud, applying the random offsets to the working point cloud to reinitialize the working point cloud, and executing an iterative closest point (ICP) process to match the reference point cloud and the working point cloud after reinitialization. The ICP process includes transformations, rotation, and translations of the working point cloud. Executing the point cloud registration includes determining an absolute error and a relative error of the working point cloud relative to the reference point cloud.

In an aspect of the present disclosure, the plurality of first data points collectively forms a first point cloud. The plurality of second data points collectively forms a second point cloud. The first point cloud is a reference point cloud. The second point cloud is a working point cloud The method includes brute force matching the first clustered points and the second clustered points, and executing an iterative closest point (ICP) process to match the reference point cloud and the working point cloud, wherein the ICP process includes transformations, rotation, and translations of the working point cloud. Executing the point cloud registration further includes determining an absolute error and a relative error of the working point cloud relative to the reference point cloud.

In an aspect of the present disclosure, the method further includes building a k-dimensional (KD) tree, wherein the first map points data are created first as the line segments. Then, the center points of the line segments are obtained and designated as the KD tree nodes. For each point on the second map, the nearest point by KD tree query and the corresponding line segments from the first map is determined. Then, the offset from this point on the second map to the line segments from the first map is calculated.

In an aspect of the present disclosure, the method further includes adding all of the plurality of absolute offsets to determine the sum of all of the plurality of absolute offsets and dividing the sum of all the of the plurality of absolute offsets by a size of the plurality of second data points to determine the relative map error.

The present disclosure also describes a tangible, non-transitory, machine-readable medium, comprising machine-readable instructions, that when executed by a processor, cause the processor to receive first map data and second map data. The first map data includes a first map of a geographic location. The second map data includes a second map of the geographic location. The first map is different from the second map. The first map data includes a plurality of first data points. The second map data includes a plurality of second data points. The non-transitory, machine-readable medium, comprising machine-readable instructions, that when executed by a processor, cause the processor to receive a road topographic map. The road topographic map illustrates a road. The non-transitory, machine-readable medium, comprising machine-readable instructions, that when executed by a processor, cause the processor to divide the road of the road topographic map into a plurality of road segments. Each of the plurality of road segments has the same road length. The non-transitory, machine-readable medium, comprising machine-readable instructions, that when executed by a processor, cause the processor to create a plurality of bounding boxes for each of the plurality of road segments. Each of the plurality of bounding boxes encloses one of the plurality of road segments.

The non-transitory, machine-readable medium, comprising machine-readable instructions, that when executed by a processor, cause the processor to create a first map tile and a second map tile by filtering out map data within one of the plurality of bounding boxes. The first map tile is obtained from the first map data. The second map tile is obtained from the second map data. The non-transitory, machine-readable medium, comprising machine-readable instructions, that when executed by a processor, cause the processor to execute point cloud registration to align the plurality of first data points in the first map tile with the plurality of second data points in the second map tile using rotation and translation transformations to determine a plurality of absolute offsets between the plurality of first data points and the plurality of second data points. The non-transitory, machine-readable medium, comprising machine-readable instructions, that when executed by a processor, cause the processor to determine a relative map error between the first map and the second map based on the absolute offsets between the plurality of first data points and the plurality of second data points.

In an aspect of the non-transitory, machine-readable medium, the relative map error is a function of a sum of the absolute offsets between the plurality of first data points and the plurality of second data points. Each of the plurality of road segments are represented by a plurality of road-segment points. Each of the plurality of bounding boxes includes a first linear boundary, a second linear boundary, a third linear boundary, and a fourth linear boundary. The plurality of road-segments points includes a first road-segment point and a second road-segment point. The first linear boundary intersects the first road-segment point. The second linear boundary intersects the second road-segment point. The first linear boundary is parallel to the second linear boundary. The third linear boundary is parallel to the fourth linear boundary. The distance from the third linear boundary to the first road-segment point along the first direction is equal to the distance from the second road-segment point to the fourth linear boundary along the first direction. The height of the bounding box extends from the third linear boundary to the fourth linear boundary. The distance from the second road-segment point to the fourth linear boundary along the first direction is half of the height of the first bounding box.

In an aspect of the present disclosure, the non-transitory, machine-readable medium, comprising machine-readable instructions, that when executed by a processor, cause the processor to change the working points from its original locations to become another data points.

In an aspect of the non-transitory, machine-readable medium, the plurality of first data points collectively forms a first point cloud. The plurality of second data points collectively forms a second point cloud. The first point cloud is a reference point cloud. The second point cloud is a working point cloud. The non-transitory, machine-readable medium includes instructions to generate a group of random offsets to change the working point cloud, apply the random offsets to the working point cloud to reinitialize the working point cloud, and execute an iterative closest point (ICP) process to match the reference point cloud and the working point cloud after reinitialization. The ICP process includes transformations, rotation, and translations of the working point cloud. The non-transitory, machine-readable medium includes instructions to determine an absolute error and a relative error of the working point cloud relative to the reference point cloud.

In an aspect of the non-transitory, machine-readable medium, the first data points collectively form a first point cloud. The plurality of second data points collectively forms a second point cloud. The first point cloud is a reference point cloud. The second point cloud is a working point cloud. The non-transitory, machine-readable medium includes instructions to cluster the reference point cloud and the working point cloud and generate a first clustered points and a second clustered points, respectively. The non-transitory, machine-readable medium includes instructions to brute force match the first clustered points and the second clustered points and execute an iterative closest point (ICP) process to match the reference point cloud and the working point cloud. The ICP process includes transformations, rotation, and translations of the working point cloud. The non-transitory, machine-readable medium includes instructions to determine an absolute error and a relative error of the working point cloud relative to the reference point cloud.

In an aspect of the non-transitory, machine-readable medium, the non-transitory, machine-readable medium includes instructions to build a KD tree, wherein the first map points data are created first as the line segments. Then, the center points of the line segments are obtained and designated as the KD tree nodes. For each point on the second map, the nearest point by KD tree query and the corresponding line segments from the first map is determined. Then, the offset from this point on the second map to the line segments from the first map is calculated.

In an aspect of the non-transitory, machine-readable medium, the non-transitory, machine-readable medium includes instructions to add all of the plurality of absolute offsets to determine the sum of all of the plurality of absolute offsets and divide the sum of all of the plurality of absolute offsets by a size of the plurality of second data points to determine the relative map error.

The present disclosure also describes a system including a controller. The controller is programmed to create a first map tile and a second map tile by filtering out map data within one of the plurality of bounding boxes. The first map tile is obtained from the first map data. The second map tile is obtained from the second map data. The controller is further programmed to execute point cloud registration to align the plurality of first data points in the first map tile with the plurality of second data points in the second map tile using rotation and translation transformations to determine a plurality of absolute offsets between the plurality of first data points and the plurality of second data points. The controller is programmed to determine a relative map error between the first map and the second map based on the absolute offsets between the plurality of first data points and the plurality of second data points.

In an aspect of the system, the controller is programmed to create a first map tile and a second map tile by filtering out map data within one of the plurality of bounding boxes. The first map tile is obtained from the first map data. The second map tile is obtained from the second map data. The controller is programmed to execute point cloud registration to align the plurality of first data points in the first map tile with the plurality of second data points in the second map tile using rotation and translation transformations to determine a plurality of absolute offsets between the plurality of first data points and the plurality of second data points. The controller is programmed to determine a relative map error between the first map and the second map based on the absolute offsets between the plurality of first data points and the plurality of second data points.

In an aspect of the present disclosure, the controller is programmed to change the working points from its original locations to become another data points. In an aspect of the present disclosure, the controller is programmed to change the working points from its original locations to become another data points.

In an aspect of the system, the plurality of first data points collectively forms a first point cloud. The plurality of second data points collectively forms a second point cloud. The first point cloud is a reference point cloud. The second point cloud is a working point cloud. The controller is programmed to generate a group of random offsets to change the working point cloud, apply the random offsets to the working point cloud to reinitialize the working point cloud, and execute an iterative closest point (ICP) process to match the reference point cloud and the working point cloud after reinitialization. The ICP process includes transformations, rotation, and translations of the working point cloud. The controller is programmed to determine an absolute error and a relative error of the working point cloud relative to the reference point cloud.

In an aspect of the system, the first data points collectively form a first point cloud. The plurality of second data points collectively forms a second point cloud. The first point cloud is a reference point cloud. The second point cloud is a working point cloud. The non-transitory, machine-readable medium includes instructions to brute force match the first clustered points and the second clustered points and execute an iterative closest point (ICP) process to match the reference point cloud and the working point cloud. The ICP process includes transformations, rotation, and translations of the working point cloud. The non-transitory, machine-readable medium includes instructions to determine an absolute error and a relative error of the working point cloud relative to the reference point cloud.

In an aspect of the system, the non-transitory, the controller is programmed to build a KD tree, wherein the first map points data are created first as the line segments. Then, the center points of the line segments are obtained and designated as the KD tree nodes. For each point on the second map, the nearest point by KD tree query and the corresponding line segments from the first map is determined. Then, the offset from this point on the second map to the line segments from the first map is calculated.

In an aspect of the system, the controller is programmed to add all of the plurality of absolute offsets to determine the sum of all of the plurality of absolute offsets and divide the sum of all of the plurality of absolute offsets by a size of the plurality of second data points to determine the relative map error.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
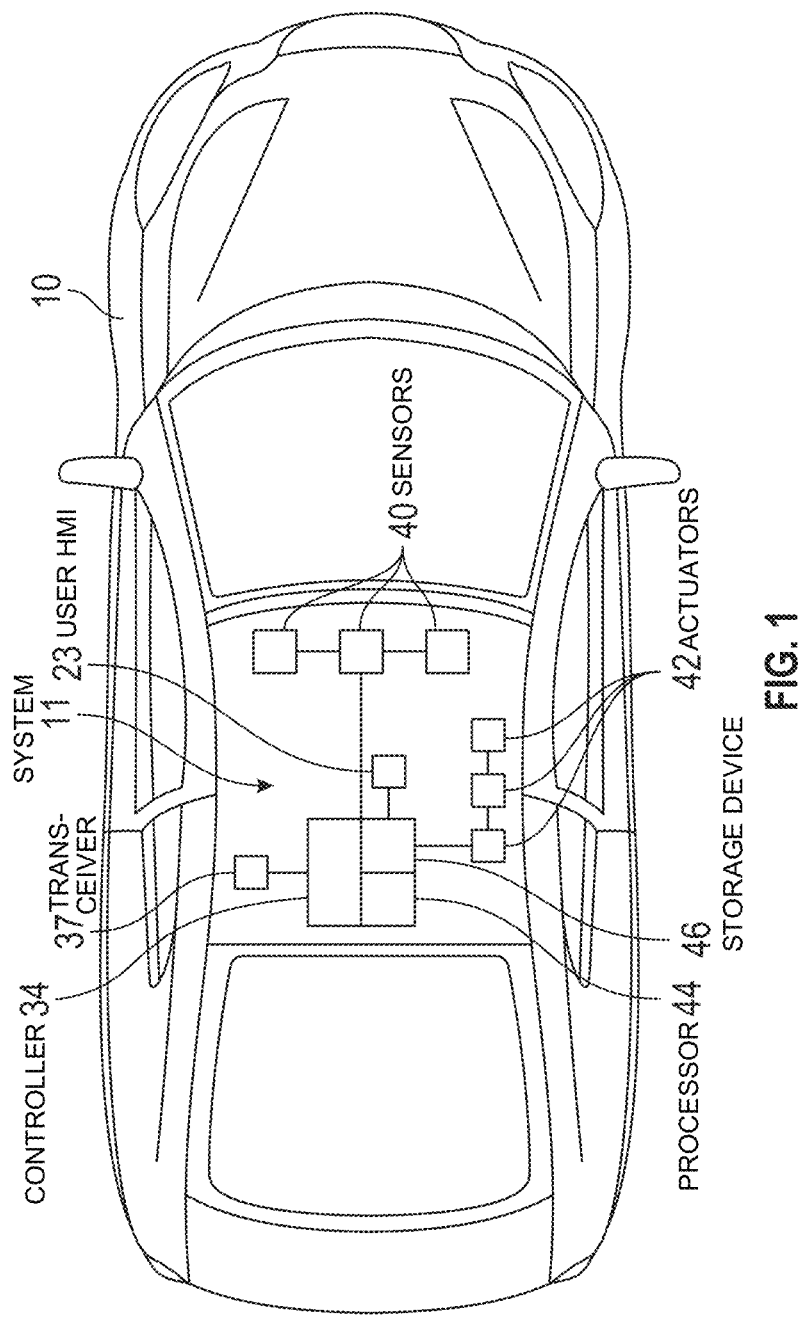
FIG. 1 is a schematic top view of a vehicle including a system for quantifying map errors.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a vehicle 10 includes (or is in communication with) a system 11 for quantifying map errors. While the system 11 is shown inside the vehicle 10, it is contemplated that the system 11 may be outside of the vehicle 10. As a non-limiting example, the system 11 may be in wireless communication with the vehicle 10. Although the vehicle 10 is shown as a sedan, it is envisioned that that vehicle 10 may be another type of vehicle, such as a pickup truck, a coupe, a sport utility vehicle (SUVs), a recreational vehicle (RVs), etc.

The vehicle 10 includes a controller 34 and one or more sensors 40 in communication with the controller 34. The sensors 40 collect information and generate sensor data indicative of the collected information. As non-limiting examples, the sensors 40 may include Global Navigation Satellite System (GNSS) transceivers or receivers, yaw rate sensors, speed sensors, lidars, radars, ultrasonic sensors, and cameras, among others. The GNSS transceivers or receivers are configured to detect the location of the vehicle 10 in the globe. The speed sensors are configured to detect the speed of the vehicle 10. The yaw rate sensors are configured to determine the heading of the vehicle 10. The cameras may have a field of view large enough to capture images in front, in the rear, and in the sides of the vehicle 10. The ultrasonic sensor may detect static and/or dynamic objects. At least one of the sensors 40 is configured to determine the current location of the vehicle 10. As non-limiting examples, this sensor 40 may be a vehicle location sensor, such as a GPS tracker.

The controller 34 is programmed to receive sensor data from the sensors 40 and includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the cameras, perform logic, calculations, methods and/or algorithms for automatically controlling the components of the vehicle 10, and generate control signals to the actuators 42 to automatically control the components of the vehicle 10 based on the logic, calculations, methods, and/or algorithms. Although a single controller 34 is shown in FIG. 1, the system 11 may include a plurality of controllers 34 that communicate over a suitable communication medium or a combination of communication mediums and that cooperate to process the sensor signals, perform logic, calculations, methods, and/or algorithms, and generate control signals to automatically control features of the system 11. In various embodiments, one or more instructions of the controller 34 are embodied in the system 11. The non-transitory computer readable storage device or media 46 includes machine-readable instructions (shown, for example, in FIG. 2), that when executed by the one or more processors, cause the processors 44 to execute the method 100 (FIG. 2), the method 200 (FIG. 4), and/or the method 300 (FIG. 5).

The vehicle 10 includes a user interface 23 in communication with the controller 34. The user interface 23 may be, for example, a touchscreen in the dashboard and may include, but is not limited to, an alarm, such as one or more speakers to provide an audible sound, haptic feedback in a vehicle seat or other object, one or more displays, one or more microphones, one or more lights, and/or other devices suitable to provide a notification or alert to the vehicle user of the vehicle 10. The user interface 23 is in electronic communication with the controller 34 and is configured to receive inputs from a vehicle user (e.g., a vehicle user or a vehicle passenger). For example, the user interface 23 may include a touch screen and/or buttons configured to receive inputs from a vehicle user. Accordingly, the controller 34 is configured to receive inputs from the vehicle user via a vehicle occupant and to provide an output (i.e., an alert) to the vehicle user.

The vehicle 10 may include one or more communication transceivers 37 in communication with the controller 34. Each of the communication transceivers 37 is configured to wirelessly communicate information to and from other remote entities, such as the remote vehicles, (through "V2V" communication), infrastructure (through "V2I" communication), remote systems at a remote call center (e.g., ON-STAR by GENERAL MOTORS), and/or personal electronic devices, such as a smart phone. The communication transceivers 37 may be configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication transceivers 37 may include one or more antennas for receiving and/or transmitting signals, such as cooperative sensing messages (CSMs). The communication transceivers 37 may be considered sensors 40 and/or sources of data. The remote vehicles may include one or more communication transceivers 37 as described above with respect to the vehicle 10.

The vehicle 10 includes one or more actuators 42 in communication with the controller 34. The actuators 42 control one or more vehicle features such as, but not limited to, a fuel injection system, one or more cam phasers, spark plugs, and a camshaft. The vehicle features may further include interior and/or exterior vehicle features such as, but are not limited to, doors, a trunk, and cabin features such as air, music, lighting, etc.

Figure 2:
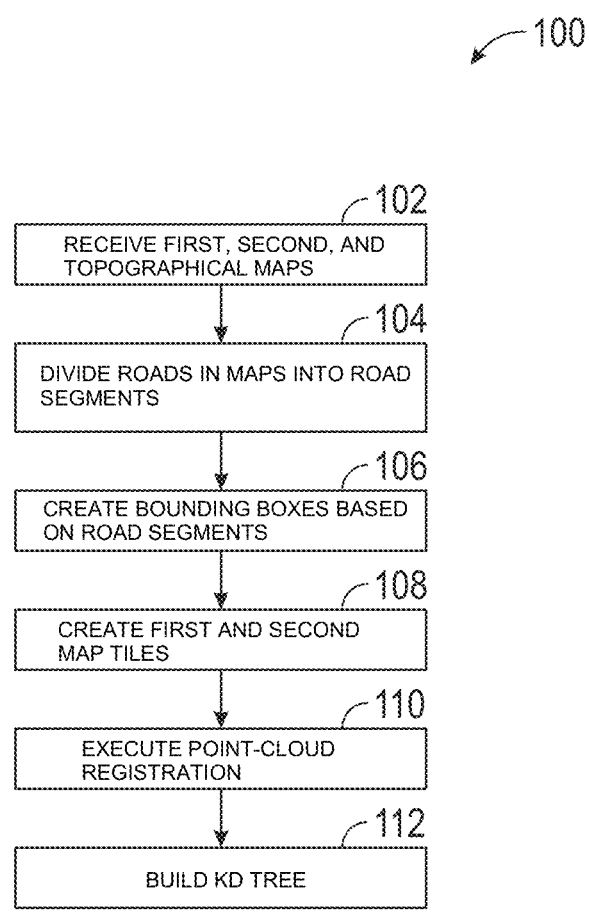
FIG. 2 a flowchart of a method for quantifying map errors between two maps.

With reference to FIGS. 1 and 2, the system 11 includes the controller 34 and is configured to quantify map errors. While the system 11 is shown inside the vehicle 10, it is envisioned that the system 11 may be outside the vehicle 10. The vehicle 10 may use maps for navigation. Maps representing the same geographical areas may be generated from different data sources, such aerial images, crowd-sourced vehicle sensor data, etc. The system 11 uses different various of these maps to create a more accurate map, thereby improving navigation. However, before fusing these maps, it is desirable to quantify the map errors between two maps and the differences between the two maps. The system 11 therefore leverages the relative map error analysis between two maps to evaluate the map differences.

FIG. 2 is a flowchart of a method 100 for quantifying map errors between two maps originating from two different sources. While the two maps originate from different sources, these two maps illustrate the same geographical location. The method 100 begins at block 102. At block 102, the controller 34 receives two versions of a map of the same geographical area. Specifically, the controller 34 receives the first map data and second map data. The first map data includes a first map of a specific geographical location, and the second map data includes a second map of the same geographical location as the first map. The first map and the second map are different with regards to their source. For example, the first map was created with aerial images, whereas the second map was created with crowd-sourced vehicle sensor data. The first map data includes a plurality of first data points, and the second map data includes a plurality of second data points. At block 102, the controller 34 may also receive a road topographic map of the same geographical location as the first map and the second map. The road topographic map illustrates one or more roads in the geographical location. In other words, the road topographic may illustrate a road network in a specific geographical area. Then, the method 100 continues to block 104.

Figure 3:
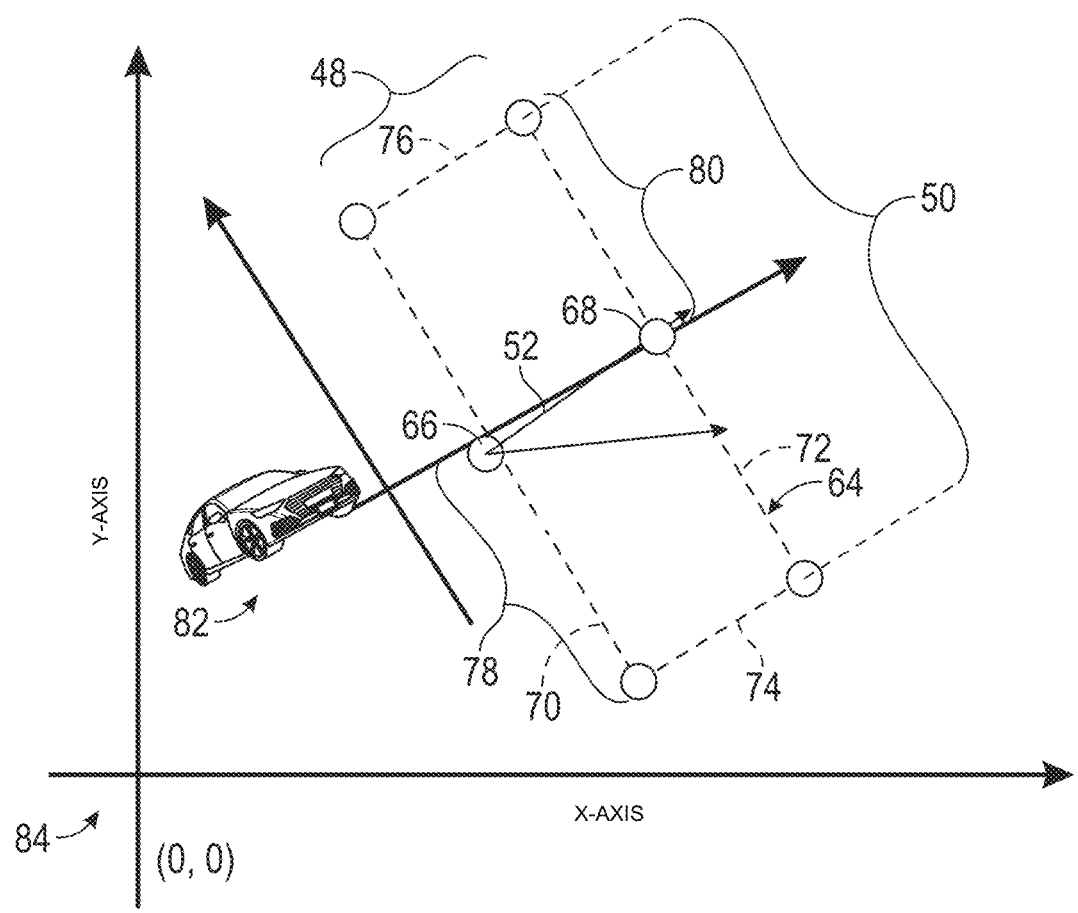
FIG. 3 is a schematic diagram of a bounding box.

At block 104, the controller 34 divides one or more roads in the road topographic map into multiple road segments 52 (FIG. 3). Each of the road segments 52 has the same length. For example, a first road segment may be identified from a first node in a road to a second node in the same road, and the second road segment may be identified from the second node to a third node in the same road. The length of each road segment may be equal to the average perception range of the vehicle 10 (e.g., fifty meters). The average perception range of the vehicle 10 may be determined by adding the maximum range of each of the sensors 40 of the vehicle and dividing that sum by the number of sensors 40 of the vehicle. Therefore, at block 104, the road segments 52 are created in the first map and the second map previously received by the controller 34. Next, the method 100 continues to block 106.

At block 106, the controller 34 creates bounding boxes 64 (FIG. 3) in the first map and the second map. The bounding boxes 64 are created based on the previously created road segments. As discussed above, the road segments have the same length. Each bounding box 64 has a width 48 and a height 50 (i.e., a maximum height). Each bounding box 64 encompasses one road segment, and the width 48 of each bounding box 64 is equal to the length of the road segment. The height 50 of the bounding box may be greater than the width of the bounding box.

With reference to FIG. 3, the bounding boxes 64 encompass the road segment 52. Each road segment 52 includes at least two road-segment points (i.e., the first road-segment point 66 and the second road-segment point 68) that define the boundaries of the road segment 52. In FIG. 3, the bounding box 64 includes a first linear boundary 70, a second linear boundary 72, a third linear boundary 74, and a fourth linear boundary 76. The first linear boundary 70 intersects the first road-segment point 66. The second linear boundary 72 intersects the second road-segment point 68. The first linear boundary 70 is parallel to the second linear boundary 72. The third linear boundary 74 is parallel to the fourth linear boundary 76. The distance 78 from the third linear boundary to the first road-segment point 66 along the first direction y' is equal to the distance 80 from the second road-segment point 68 to the fourth linear boundary 76 along the first direction y'. The height 50 (i.e., maximum height) of the bounding box extends from the third linear boundary 74 to the fourth linear boundary 76. The distance 80 from the second road-segment point 68 to the fourth linear boundary 76 along the first direction y' is half of the maximum height of the first bounding box. The road segment 52 is parallel to a second direction x'. The second direction 'x is orthogonal to the first direction y' the first direction y' and the second direction x' may be defined as axes that form a vehicle coordinate system 82 for the bounding box 64.

As discussed above, the first road-segment point 66 and the second road-segment point 68 define the extreme ends (i.e., termini) of the road segment 52. The controller 34 uses the first road-segment 64 and the second road-segment point 68 to create the bounding box 64. In the vehicle coordinate system 82, the x'-axis (which is defined by the 'x direction) is parallel to the road segment 64, and the y'-axis (which is defined by the y' direction is perpendicular to the road segment 64. The angle θ is the heading of the vehicle 10. In vehicle coordinate system 82, the first road-segment point 66 is at coordinate (x1, y1) of the vehicle coordinate system 82, and the second road-segment point 38 is at coordinate (x2, y2). The distance 80 from the second road-segment point 68 to the fourth linear boundary 76 along the first direction y' is half of the height 50 of the bounding box 64. distance 80 from the second road-segment point 68 to the fourth linear boundary 76 is constant for all the bounding boxes 64. Further, the distance 80 from the second road-segment point 68 to the fourth linear boundary 76 along the first direction y' may be represented by the letter "d". The bounding box defines four corner points (i.e., first corner point Q1 at coordinate (x1, y1+d), second corner point Q2 at coordinate (x2, y2+d), third corner point (x1, y1−d), and fourth corner point Q4 (x2, yd−d).

With continued reference to FIG. 3, the coordinate of the origin of the vehicle coordinate system 82 is (m, n). Further at block 106, the origin of the vehicle coordinate system 82 is translated to the origin of a global coordinate system 84. At this juncture, the coordinates of the bounding boxes will be the following: first corner point Q1 (x1+m, y1+d+n), second corner point Q2 (x2+m, y2+d+n), third corner point Q3 (x1+m, y1−d+n), and fourth corner point Q4 (x2+m, y2−d+n). Then, the vehicle coordinate system 82 is rotated coordinate system such that the x'-axis of the vehicle coordinate system 82 aligns with the x-axis of the global coordinate 84 and the y'-axis of the vehicle coordinate system 82 aligns of the y-axis of the global coordinate system 84. In this rotation, the rotation angle in clockwise is θ (which is the heading of the vehicle 10). After the rotation, in the global coordinate system xy, the coordinates of the bounding box 64 are: the first corner point Q1 ((x1+m)*cos θ+(y1+d+n)*sin θ, (y1+d+n)*cos θ−(x1+m)*sin θ), the second corner point Q2 ((x2+m)*cos θ+(y2+d+n)*sin θ, (y2+d+n)*cos θ−(x2+m)*sin θ), the third corner point Q3 ((x1+m)*cos θ+(y1−d+n)*sin θ, (y1−d+n)*cos θ−(x1+m)*sin θ), and the fourth corner point Q4 ((x2+m)*cos θ+(y2−d+n)*sin θ, (y2−d+n)*cos θ−(x2+m)*sin θ). Then, the method 100 proceeds to block 108.

Returning to FIG. 2, at block 108, the controller 34 creates a first map tile and a second map tile from the first map and the second map by filtering out the map data inside the bounding box 64. The first map tile is obtained by filtering the first map data, and the second map tile is obtained by filtering second map data. For all the bounding boxes 64, the controller 34 creates the first map tile and the second map tile from the first map and the second map, respectively. The filtered data to create the map tiles (i.e., the first map tile and the second map tile) may be part of the map data inside of the bounding box 64 but outside the lanes lines. Next, the method 100 continues to block 110.

At block 110, the controller 34 executes a point cloud registration to align the plurality of first data points in the first map tile with the plurality of second data points in the second map tile using rotation and translation transformations to determine the absolute offsets between the first data points of the first map data and the second data points of the second map data as discussed below with respect to them method 200 (FIG. 4) or the method 300 (FIG. 5). The controller 34 may use an iterative closest point (ICP) process or algorithm to the plurality of first data points in the first map tile with the plurality of second data points in the second map tile using rotation and translation transformations. The point cloud registrations may be performed using different methods as described in detail below. Then, the method 100 continues to block 112.

At block 112, the controller 34 builds a KD tree with the first data points using a KD algorithm, wherein the first map points data are created first as the line segments. Then, the center points of the line segments are obtained and designated as the KD tree nodes. For each point on the second map, the nearest point by KD tree query and the corresponding line segments from the first map is determined. Then, the offset from this point on the second map to the line segments from the first map is calculated. Then, the controller 34 determines, using the KD tree, the absolute offsets from each of the plurality of first data points to each corresponding second data points. To do so, the controller 34 calculates the distance from one of the first data points of the first map data to the corresponding second data point of the second map data. This process is repeated from all to determine all the absolute offsets between the first map data and the second map data. The controller 34 then adds all of the absolute offsets divide the size of the second data points of the second map data to determine the relative map error. Therefore, the relative map error is a function of a sum of the offsets between the first data points and the second data points.

Figure 4:
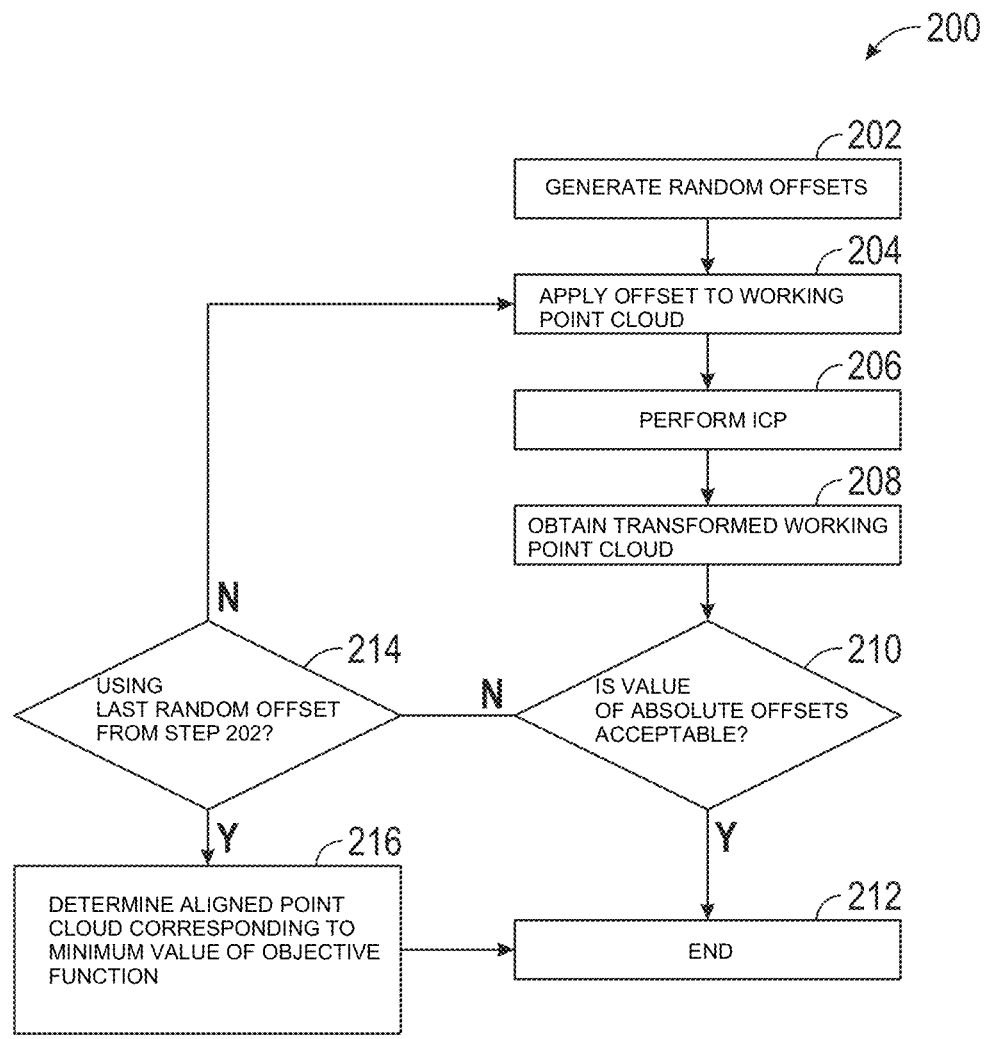
FIG. 4 is a flowchart of a random initialization method for aligning two maps based on the point cloud registration.
Figure 5:
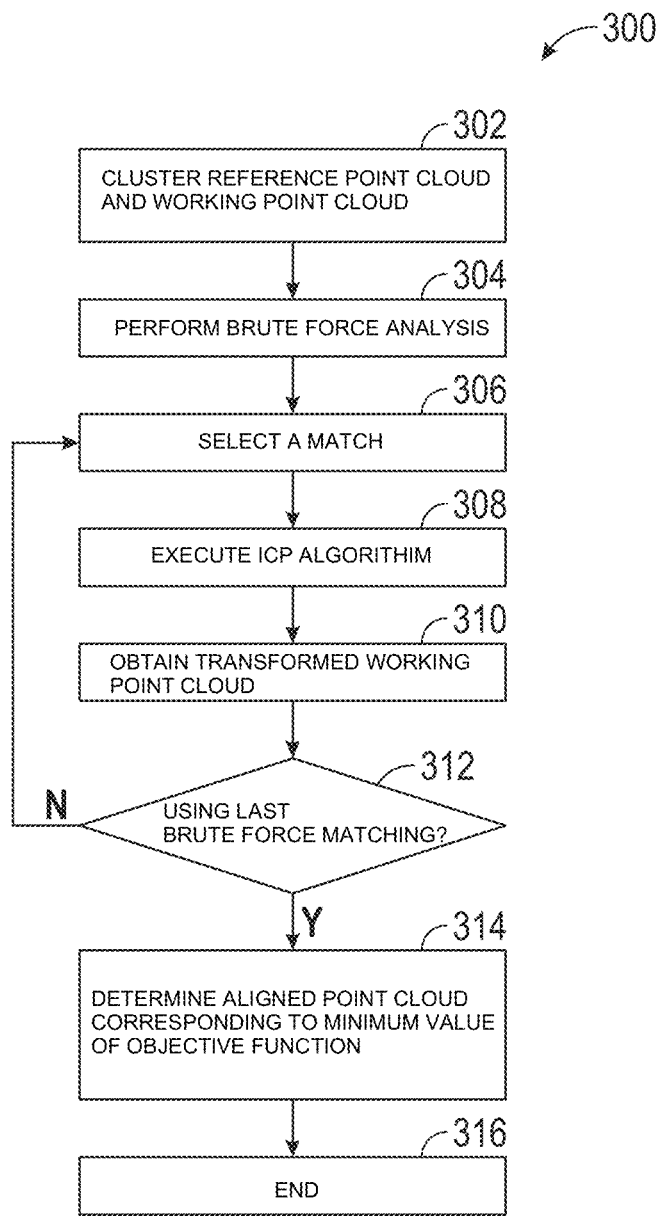
FIG. 5 is a flowchart of a method for aligning two maps based on the point cloud registration using point clustering.

FIG. 4 is a flowchart of a random initialization method 200 for aligning two maps based on the point cloud registration. The method 200 begins at block 202. At block 202, the controller 34 generates a group of random offsets. To do so, the controller 34 creates a group of suitable random offsets to change the working point cloud, which is formed by the second data points. The first data points collectively form a first point cloud. The first point cloud may be referred to as a reference point cloud. The second data points collectively form a second point cloud. The second point cloud may be referred to as the working point cloud. Then, the method 200 proceeds to block 204.

At block 204, the controller 34 applies a random offset to the working point cloud to reinitialize the working point cloud. Then, the method 200 continues to block 206. At block 206, the controller 34 performs an iterative closest point (ICP) process or algorithm to match (or at least minimize the difference between) the reference cloud point and the previously reinitialized working point cloud. The iterative closest point (ICP) process uses an objective function and includes a series of transformations, rotations, and translations of the working point cloud. Thereafter, the method 200 continues to block 208.

At block 208, the controller 34 obtains a transformed working point cloud, which may be designated as the aligned point cloud. Further, at block 208, the controller 34 obtains (e.g., calculates) the absolute errors between the reference point cloud relative and the aligned point cloud by the objective function of the ICP process for each of the corresponding data points. The absolute error may be referred to as the absolute offsets between the reference point cloud and the aligned point cloud and Next, the method 200 continues to block 210.

At block 210, the controller 34 determines whether the value of the objective function (i.e., the absolute offsets) is acceptable. To do so, the controller 34 compares the absolute error with a predetermined threshold to determine whether the absolute error is equal to or less than the predetermined threshold. If the absolute error is equal to or less than the predetermined threshold, then the method 200 continues to block 212. At block 212, the method 200 ends. If the absolute error is greater than the predetermined threshold, then the method 200 proceeds to block 214. At block 214, the controller 34 determines whether the method 200 is currently using the last random offset of the group of random offsets generated at block 202. If the method 200 is currently using the last random offset, then the method 200 proceeds to block 216. At block 216, the controller 34 determines the aligned point cloud corresponding to the minimum value of the objective function. After block 216, the method 200 continues to block 212. At block 212, the method 200 ends.

FIG. 5 is a flowchart of a method 300 for aligning two maps based on the point cloud registration. The method 300 begins at block 302. At block 302, the controller 34 clusters the reference point cloud and the working point cloud to generate a first clustered points and a second clustered points, respectively. Then, the method 300 continues to block 304.

At block 304, the controller 34 performs brute force process to match the first clustered points with the second clustered points. The brute force approach is a guaranteed way to find the correct solution by listing all the possible candidate solutions for the problem. Accordingly, at block 304, the controller 34 generates a plurality of brute force matching between the first clustered points with the second clustered points. Then, the method 300 continues to block 306.

At block 306, the controller 34 traverses all the matches determined in block 304 and iteratively selects one match. Eventually, the controller 34 selects all the matches. Subsequently, the method 300 continues to block 308.

At block 308, the controller 34 executes an ICP algorithm to match the reference point cloud with the working point cloud. As discussed above, the first point cloud may be referred to as a reference point cloud, and the second point cloud may be referred to as the working point cloud. The ICP process may include a series of transformations, rotation and translations of the working point cloud. Next, the method 300 process to block 310.

At block 310, the controller 34 obtains a transformed working point cloud, which may be designated as the aligned point cloud. Further, at block 310 the controller 34 obtains (e.g., calculates) the absolute errors between the reference point cloud relative and the aligned point cloud by the objective function of the ICP process for each of the corresponding data points. The absolute error may be referred to as the absolute offsets between the reference point cloud and the aligned point cloud and Next, the method 300 continues to block 312.

At block 312, the controller 34 determines whether the method 300 is currently analyzing the last brute force matching. If the method 300 is not currently analyzing the last brute force matching, then the method 300 returns to block 306. If the method 300 is currently analyzing the last brute force matching, then the method 300 proceeds to block 314. At block 314, the controller 34 determines the aligned point cloud corresponding to the minimum value of the objective function. After block 314, the method 300 continues to block 316. At block 316, the method 300 ends.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for quantifying map errors in a navigation system of an autonomous vehicle, the method comprising:
    receiving first map data and second map data, wherein the first map data includes a first map of a geographic location, the second map data includes a second map of the geographic location, the first map is different from the second map, the first map data includes a plurality of first data points, and the second map data includes a plurality of second data points;
    receiving a road topographic map, wherein the road topographic map illustrates a road;
    dividing the road of the road topographic map into a plurality of road segments, wherein each of the plurality of road segments has a same road length, and each of the plurality of road segments are created in the first map and the second map;
    creating a plurality of bounding boxes for each of the plurality of road segments in the first map and the second map, wherein each of the plurality of bounding boxes encloses one of the plurality of road segments;
    creating a first map tile and a second map tile by filtering out the first map data and the second map data within one of the plurality of bounding boxes, wherein the first map tile is obtained from the first map data, and the second map tile is obtained from the second map data;
    executing point cloud registration to align the plurality of first data points in the first map tile with the plurality of second data points in the second map tile using rotation and translation transformations to determine a plurality of absolute offsets between the plurality of first data points and the plurality of second data points;
    determining a relative map error between the first map and the second map based on the absolute offsets between the plurality of first data points and the plurality of second data points; and
    controlling the autonomous vehicle based at least in part on the relative map error,
    wherein the relative map error is a function of a sum of the absolute offsets between the plurality of first data points and the plurality of second data points, and
    wherein each of the plurality of road segments are represented by a plurality of road-segment points, each of the plurality of bounding box includes a first linear boundary, a second linear boundary, a third linear boundary, and a fourth linear boundary, the plurality of road-segments points includes a first road-segment point and a second road-segment point, the first linear boundary intersects the first road-segment point, the second linear boundary intersects the second road-segment point, the first linear boundary is parallel to the second linear boundary, the third linear boundary is parallel to the fourth linear boundary, a distance from the third linear boundary to the first road-segment point along a first direction is equal to the distance from the second road-segment point to the fourth linear boundary along the first direction, a height of the bounding box extends from the third linear boundary to the fourth linear boundary, and a distance from the second road-segment point to the fourth linear boundary along the first direction is half of the height of the first bounding box.

2. The method of claim 1, wherein the plurality of first data points collectively forms a first point cloud, the plurality of second data points collectively form a second point cloud, the first point cloud is a reference point cloud, the second point cloud is a working point cloud, and executing the point cloud registration includes:
    generating a group of random offsets to change the working point cloud;
    applying the random offsets to the working point cloud to reinitialize the working point cloud;
    executing an iterative closest point (ICP) process to match the reference point cloud and the working point cloud after reinitialization, wherein the ICP process includes transformations, rotation, and translations of the working point cloud; and
    determining an absolute error of the working point cloud relative to the reference point cloud.

3. The method of claim 1, wherein the plurality of first data points collectively forms a first point cloud, the plurality of second data points collectively forms a second point cloud, the first point cloud is a reference point cloud, the second point cloud is a working point cloud, and executing the point cloud registration includes:
clustering the reference point cloud and the working point cloud to generate a first clustered points and a second clustered points, respectively;
brute force matching the first clustered points and the second clustered points;
executing an iterative closest point (ICP) process to match the reference point cloud and the working point cloud, wherein the ICP process includes transformations, rotation, and translations of the working point cloud; and
determining an absolute error of the working point cloud relative to the reference point cloud.

4. The method of claim 2, further comprising:
building a KD tree, wherein the first map points data are created as the line segments, the center points of the line segments are the obtained and designated as the KD tree nodes, for each point on the second map, the nearest point by KD tree query and the corresponding line segments from the first map is determined, and then the offset from this point on the second map to the line segments from the first map is calculated; and
determining a plurality of absolute offsets from each of the plurality of first data points and each corresponding one of the plurality of second data points using the KD tree.

5. The method of claim 4, further comprising:
adding all of the plurality of absolute offsets to determine the sum of all of the plurality of absolute offsets; and
dividing the sum of all of the plurality of absolute offsets by a size of the plurality of second data points to determine the relative map error.

6. A tangible, non-transitory, machine-readable medium, comprising machine-readable instructions, that when executed by a processor, cause the processor to:
receive first map data and second map data, wherein the first map data includes a first map of a geographic location, the second map data includes a second map of the geographic location, the first map is different from the second map, the first map data includes a plurality of first data points, and the second map data includes a plurality of second data points;
receive a road topographic map, wherein the road topographic map illustrates a road;
divide the road of the road topographic map into a plurality of road segments, wherein each of the plurality of road segments has a same road length, and each of the plurality of road segments are created in the first map and the second map;
create a plurality of bounding boxes for each of the plurality of road segments in the first map and the second map, wherein each of the plurality of bounding boxes encloses one of the plurality of road segments;
create a first map tile and a second map tile by filtering out the first map data and the second map data within one of the plurality of bounding boxes, wherein the first map tile is obtained from the first map data, and the second map tile is obtained from the second map data;
execute point cloud registration to align the first map tile with the second map tile using rotation and translation transformations to determine a plurality of absolute offsets between the plurality of first data points and the plurality of second data points;
determine a relative map error between the first map and the second map based on the absolute offsets between the plurality of first data points and the plurality of second data points; and
control an autonomous vehicle based at least in part on the relative map error,
wherein the relative map error is a sum of the absolute offsets between the plurality of first data points and the plurality of second data points, and each of the plurality of road segments are represented by a plurality of road-segment points, each of the plurality of bounding box includes a first linear boundary, a second linear boundary, a third linear boundary, and a fourth linear boundary, the plurality of road-segments points includes a first road-segment point and a second road-segment point, the first linear boundary intersects the first road-segment point, the second linear boundary intersects the second road-segment point, the first linear boundary is parallel to the second linear boundary, the third linear boundary is parallel to the fourth linear boundary, a distance from the third linear boundary to the first road-segment point along a first direction is equal to the distance from the second road-segment point to the fourth linear boundary along the first direction, a height of the bounding box extends from the third linear boundary to the fourth linear boundary, and a distance from the second road-segment point to the fourth linear boundary along the first direction is half of the height of the first bounding box.

7. The tangible, non-transitory, machine-readable medium of claim 6, wherein the tangible, non-transitory, machine-readable medium further comprising machine-readable instructions, that when executed by the processor, causes the processor to change the working points from an original locations to become different data points.

8. The tangible, non-transitory, machine-readable medium of claim 7, wherein the plurality of first data points collectively form a first point cloud, the plurality of second data points collectively form a second point cloud, the first point cloud is a reference point cloud, the second point cloud is a working point cloud, and the tangible, non-transitory, machine-readable medium further comprising machine-readable instructions, that when executed by the processor, causes the processor to:
generate a group of random offsets to change the working point cloud;
apply the random offsets to the working point cloud to reinitialize the working point cloud;
execute an iterative closest point (ICP) process to match the reference point cloud and the working point cloud after reinitialization, wherein the ICP process includes transformations, rotation, and translations; and
determine an absolute error of the working point cloud relative to the reference point cloud.

9. The tangible, non-transitory, machine-readable medium of claim 6, wherein the plurality of first data points collectively form a first point cloud, the plurality of second data points collectively form a second point cloud, the first point cloud is a reference point cloud, the second point cloud is a working point cloud, and the tangible, non-transitory, machine-readable medium further comprising machine-readable instructions, that when executed by the processor, causes the processor to:
cluster the reference point cloud and the working point cloud to generate a first clustered points and a second clustered points, respectively;

brute force match the first clustered points and the second clustered points;

execute an iterative closest point (ICP) process to match the reference point cloud and the working point cloud, wherein the ICP process includes transformations, rotation, and translations of the working point cloud; and determine an absolute error of the working point cloud relative to the reference point cloud.

10. The tangible, non-transitory, machine-readable medium of claim 6, wherein the tangible, non-transitory, machine-readable medium further comprising machine-readable instructions, that when executed by the processor, causes the processor to:

building a KD tree, wherein the first map points data are created as the line segments, the center points of the line segments are the obtained and designated as the KD tree nodes, for each point on the second map, the nearest point by KD tree query and the corresponding line segments from the first map is determined, and then the offset from this point on the second map to the line segments from the first map is calculated; and determine a plurality of absolute offsets from each of the plurality of first data points and each corresponding one of the plurality of second data points using the KD tree.

11. The tangible, non-transitory, machine-readable medium of claim 10, wherein the tangible, non-transitory, machine-readable medium, further comprising machine-readable instructions, that when executed by the processor, causes the processor to:

add all the of the plurality of absolute offsets to determine a sum of all the of the plurality of absolute offsets; and divide the sum of all the of the plurality of absolute offsets by a size of the plurality of second data points to determine the relative map error.

12. A system, comprising:

a controller in an autonomous vehicle, the controller programmed to:

receive first map data and second map data, wherein the first map data includes a first map of a geographic location, the second map data includes a second map of the geographic location, the first map is different from the second map, the first map data includes a plurality of first data points, and the second map data includes a plurality of second data points;

receive a road topographic map, wherein the road topographic map illustrates a road;

divide the road of the road topographic map into a plurality of road segments, wherein each of the plurality of road segments has a same road length, and each of the plurality of road segments are created in the first map and the second map;

create a plurality of bounding boxes for each of the plurality of road segments in the first map and the second map, wherein each of the plurality of bounding boxes encloses one of the plurality of road segments;

create a first map tile and a second map tile by filtering out the first map data and the second map data within one of the plurality of bounding boxes, wherein the first map tile is obtained from the first map data, and the second map tile is obtained from the second map data;

execute point cloud registration to align the first map tile with the second map tile using rotation and translation transformations to determine a plurality of absolute offsets between the plurality of first data points and the plurality of second data points;

determine a relative map error between the first map and the second map based on the absolute offsets between the plurality of first data points and the plurality of second data points control the autonomous vehicle based at least in part on the relative map error, wherein the relative map error is a function of a sum of the absolute offsets between the plurality of first data points and the plurality of second data points, and wherein each of the plurality of road segments are represented by a plurality of road-segment points, each of the plurality of bounding box includes a first linear boundary, a second linear boundary, a third linear boundary, and a fourth linear boundary, the plurality of road-segments points includes a first road-segment point and a second road-segment point, the first linear boundary intersects the first road-segment point, the second linear boundary intersects the second road-segment point, the first linear boundary is parallel to the second linear boundary, the third linear boundary is parallel to the fourth linear boundary, a distance from the third linear boundary to the first road-segment point along a first direction is equal to the distance from the second road-segment point to the fourth linear boundary along the first direction, a height of the bounding box extends from the third linear boundary to the fourth linear boundary, and a distance from the second road-segment point to the fourth linear boundary along the first direction is half of the height of the first bounding box.

13. The system of claim 12, wherein the plurality of first data points collectively form a first point cloud, the plurality of second data points collectively form a second point cloud, the first point cloud is a reference point cloud, the second point cloud is a working point cloud, and the controller is programmed to:

generate a group of random offsets to change the working point cloud;

apply the random offsets to the working point cloud to reinitialize the working point cloud;

execute an iterative closest point (ICP) process to match the reference point cloud and the working point cloud after reinitialization, wherein the ICP process includes transformations, rotation, and translations; and determine an absolute error of the working point cloud relative to the reference point cloud.

14. The system of claim 13, wherein the plurality of first data points collectively form a first point cloud, the plurality of second data points collectively form a second point cloud, the first point cloud is a reference point cloud, the second point cloud is a working point cloud, and the controller is programmed to:

cluster the reference point cloud and the working point cloud to generate a first clustered points and a second clustered points, respectively;

brute force match the first clustered points and the second clustered points;

execute an iterative closest point (ICP) process to match the reference point cloud and the working point cloud, wherein the ICP process includes transformations, rotation, and translations of the working point cloud; and determine an absolute error of the working point cloud relative to the reference point cloud.

15. The system of claim 12, wherein the controller is programmed to:

building a KD tree, wherein the first map points data are created as the line segments, the center points of the line segments are the obtained and designated as the KD tree nodes, for each point on the second map, the nearest point by KD tree query and the corresponding line segments from the first map is determined, and then the offset from this point on the second map to the line segments from the first map is calculated;

determine a plurality of absolute offsets from each of the plurality of first data points and each corresponding one of the plurality of second data points using the KD tree;

add all the of the plurality of absolute offsets to determine the sum of all the of the plurality of absolute offsets; and divide the sum of all the of the plurality of absolute offsets by a size of the plurality of second data points to determine the relative map error.

\* \* \* \* \*